(12) United States Patent
Sweatman

(10) Patent No.: US 6,167,967 B1
(45) Date of Patent: Jan. 2, 2001

(54) METHODS OF SEALING SUBTERRANEAN ZONES

(75) Inventor: Ronald E. Sweatman, Montgomery, TX (US)

(73) Assignee: Halliburton Energy Services, Inc., Duncan, OK (US)

( * ) Notice: Under 35 U.S.C. 154(b), the term of this patent shall be extended for 0 days.

(21) Appl. No.: 09/249,699

(22) Filed: Feb. 12, 1999

Related U.S. Application Data

(62) Division of application No. 08/818,146, filed on Mar. 14, 1997, now Pat. No. 5,913,364.

(51) Int. Cl.[7] .......................... C09K 7/02; E21B 33/138
(52) U.S. Cl. .......................... 166/281; 166/294; 166/295; 166/300; 175/72; 507/231; 507/277; 507/901
(58) Field of Search ........................... 166/281, 292, 166/293, 294, 295, 300; 175/72; 507/219, 231, 240, 277, 901

(56) References Cited

U.S. PATENT DOCUMENTS

| | | |
|---|---|---|
| 2,637,692 | 5/1953 | Nahin . |
| 2,675,353 | 4/1954 | Dawson . |
| 2,960,465 * | 11/1960 | Brink ............................... 507/901 X |
| 3,082,823 | 3/1963 | Hower . |
| 3,467,208 | 9/1969 | Kelly, Jr. ............................... 175/72 |
| 3,724,564 | 4/1973 | Messenger ............................. 175/72 |
| 3,724,565 * | 4/1973 | Kelly, Jr. ............................... 175/72 |
| 3,730,271 | 5/1973 | Gall ...................................... 166/294 |
| 3,812,937 * | 5/1974 | Abbott et al. ......................... 188/266 |
| 4,173,999 | 11/1979 | Messenger ............................. 166/293 |
| 4,360,120 | 11/1982 | Samuel et al. ........................ 524/494 |
| 4,368,828 | 1/1983 | Samuel et al. . |
| 4,383,054 | 5/1983 | Schulzer et al. ...................... 523/131 |
| 4,397,354 | 8/1983 | Dawson et al. ........................ 175/72 |
| 4,439,328 | 3/1984 | Moity . |
| 4,442,241 | 4/1984 | Drake et al. ........................... 523/130 |
| 4,503,170 | 3/1985 | Drake et al. ........................... 523/130 |
| 4,566,977 | 1/1986 | Hatfield . |
| 4,633,950 | 1/1987 | Delhommer et al. .................. 175/72 |
| 4,643,255 | 2/1987 | Sandiford ............................. 166/295 |
| 4,740,319 | 4/1988 | Patel et al. . |
| 4,753,974 * | 6/1988 | Goodman et al. .................... 524/447 |
| 4,836,940 | 6/1989 | Alexander . |
| 5,151,131 | 9/1992 | Burkhalter et al. ................... 106/822 |
| 5,258,072 * | 11/1993 | Gopalkirshnan et al. ....... 166/293 X |
| 5,306,739 | 4/1994 | Lucey ..................................... 522/42 |
| 5,372,641 | 12/1994 | Carpenter .............................. 106/714 |
| 5,447,197 | 9/1995 | Rae ....................................... 166/293 |
| 5,458,195 | 10/1995 | Totten et al. .......................... 166/293 |
| 5,547,506 | 8/1996 | Rae et al. ............................... 106/730 |
| 5,569,324 | 10/1996 | Totten et al. .......................... 106/696 |
| 5,588,488 | 12/1996 | Vijn et al. ............................. 166/293 |
| 5,629,270 | 5/1997 | Van Slyke ............................ 507/125 |
| 5,663,123 | 9/1997 | Goodhue, Jr. et al. ............... 507/225 |
| 5,669,456 * | 9/1997 | Audibert et al. ........................ 175/72 |
| 5,688,844 | 11/1997 | Chatterji et al. .......................... 524/8 |
| 5,738,463 | 4/1998 | Onan ..................................... 405/154 |
| 5,795,924 | 8/1998 | Chatterji et al. ...................... 523/130 |
| 5,820,670 | 10/1998 | Chatterji et al. ...................... 106/727 |
| 6,060,434 * | 5/2000 | Sweatman et al. ................... 507/901 |

FOREIGN PATENT DOCUMENTS

| | | |
|---|---|---|
| 31 35 892 A1 | 9/1991 | (CH) . |
| 0 280 341 A1 | 8/1988 | (EP) . |
| 2 701 733 | 8/1994 | (FR) . |
| 2 108 175 | 5/1983 | (GB) . |
| WO 81/00874 | 4/1981 | (WO) . |
| WO 96/00762 | 4/1996 | (WO) . |

OTHER PUBLICATIONS

Abstract No. XP–002069564, The American Petroleum Institute, New York.
Abstract No. XP–002069604, Derwent Publications, Ltd., London, GB.
Abstract No. XP–002069565, Derwent Publications, Ltd., London, GB.
Abstract No. XP–002069606, Derwent Publications, Ltd., London, GB.
Abstract No. XP–002069605, Derwent Publications, Ltd., London, GB.
Abstract No. XP–002098058, Derwent Publications, Ltd., London, GB.

* cited by examiner

*Primary Examiner*—George Suchfield
(74) *Attorney, Agent, or Firm*—Craig W. Roddy

(57) ABSTRACT

The present invention provides improved methods of sealing a subterranean zone to remedy the uncontrolled flow of fluids into and out of the zone. The methods basically comprise preparing a sealing composition and placing the composition into the zone to be sealed. The placement of the composition is controlled in a manner whereby portions of the sealing composition are continuously converted to sealing masses which are successively diverted into permeable portions of the zone until all of the permeable portions are sealed.

25 Claims, No Drawings

METHODS OF SEALING SUBTERRANEAN ZONES

This is a divisional of application Ser. No. 08/818,146 filed on Mar. 14, 1997, now U.S. Pat. No. 5,913,364.

BACKGROUND OF THE INVENTION

1. Field of the Invention

The present invention relates to improved methods of sealing subterranean zones to remedy the uncontrolled flow of fluids into and from the zones.

2. Description of the Prior Art

In the drilling of oil and gas wells using the rotary drilling method, drilling fluid is circulated through the drill string and drill bit and then back to the surface by way of the well bore being drilled. The drilling fluid maintains hydrostatic pressure on the subterranean zones through which the well bore is drilled and circulates cuttings out of the well bore. During such drilling, subterranean vugs, fractures and other drilling fluid thief zones are often encountered whereby the drilling fluid circulation is lost and drilling operations must be terminated while remedial steps are taken. Also, when a subterranean zone is penetrated containing fluids under a pressure which exceeds the hydrostatic pressure exerted on the zone by the drilling fluid, formation fluid crossflows and/or underground blow-outs can and often do occur.

Heretofore, a variety of methods of sealing compositions have been developed and used for combatting lost circulation, crossflow and underground blow-out problems. However, such methods and compositions have often been unsuccessful due to delayed and inadequate viscosity development by the sealing compositions used. Also, the methods of placement of the sealing compositions have been inadequate to cause plugging of all the weak permeable portions of the zones being treated and to prevent bypassing of such portions by the sealing compositions and/or the wash out of the compositions.

Thus, there is a need for improved methods of placing sealing compositions in subterranean zones to remedy lost circulation, crossflow and underground blow-out problems.

SUMMARY OF THE INVENTION

The present invention provides improved methods of sealing subterranean zones which meet the needs described above and overcome the deficiencies of the prior art. The methods are utilized to seal a subterranean zone penetrated by a well bore during the drilling of the well bore to terminate the uncontrolled flow of fluids into and out of the zone by way of permeable portions of the zone. The methods are basically comprised of the steps of preparing a pumpable sealing composition which very rapidly converts into a high viscosity sealing mass upon mixing and reacting with drilling and other fluids in the well bore comprised of water, oil or both. The sealing composition is pumped into the well bore and into the subterranean zone to be sealed through one or more openings at the end of a string of drill pipe contained in the well bore. The sealing composition is pumped at a low flow rate relative to the well bore fluids therein whereby the sealing composition flows through the well bore fluids with a minimum of mixing therewith. As the sealing composition moves through the well bore fluids, portions of the sealing composition are continuously mixed with the well bore fluids and converted to sealing masses which are successively diverted into and seal the weak permeable portions of the zone through which fluids are flowing out of the well bore. The successive sealing of the weak permeable portions of the subterranean zone (the most permeable portions first followed by the less permeable) allows the hydrostatic pressure exerted in the well bore and in the zone being sealed to increase until all of the permeable portions in the zone are sealed.

It is, therefore, a general object of the present invention to provide improved methods of sealing subterranean zones.

A further object of the present invention is the provision of improved methods of sealing a subterranean zone penetrated by a well bore in which drilling fluid is being lost, a crossflow of formation fluids is occurring or formation fluids are flowing into the well bore.

Other and further objects, features and advantages of the present invention will be readily apparent to those skilled in the art upon a reading of the description of preferred embodiments which follows.

DESCRIPTION OF PREFERRED EMBODIMENTS

In the drilling of wells, subterranean zones are often encountered which contain high incidences of natural vugs and fractures. As a result, drilling fluid circulation is often lost which requires the termination of the drilling and the implementation of remedial procedures which are often of long duration and high cost. Such remedial procedures have heretofore involved the placement of hardenable compositions such as Portland cement compositions or crosslinked stiff gels and the like in the lost circulation zone. However, as mentioned above, because such compositions require considerable time to harden or gel, successful sealing of the zone often does not take place. In addition to drilling fluid lost circulation zones, zones containing pressurized fluids are often encountered which cause gas, oil or water crossflows that dilute and wash away sealing compositions. Also, underground blow-outs whereby formation fluids flow into the well bore at low to high flow rates and force drilling fluid out of the well bore can take place.

The present invention provides improved methods of sealing subterranean zones penetrated by well bores to prevent the uncontrolled flow of fluids into or out of the zones by way of permeable portions of the zones, e.g., lost drilling fluid circulation, crossflows, underground blow-outs and the like. The methods utilize improved compositions for sealing subterranean zones which rapidly convert into high viscosity sealing masses upon mixing and reacting with drilling fluid and other fluids contained in the well bore comprised of water, oil or both, collectively referred to hereinbelow as "well bore fluids."

A subterranean zone containing vugs, fractures and other permeable portions through which the uncontrolled flow of fluids takes place is generally encountered during drilling when the well bore is filled with drilling fluid and a string of drill pipe is disposed therein. The drilling must be terminated pending the sealing the zone, i.e., the sealing of the permeable portions of the zone to stop the drilling fluid circulation loss, crossflow, blowout or other problem encountered. In accordance with the methods of this invention, a pumpable sealing composition which rapidly converts into a high viscosity sealing mass upon mixing and reacting with well bore fluids is prepared. As mentioned, the well bore fluids can be drilling fluid or formation fluids contained in the well bore comprised of water, oil or both. Upon mixing with the well bore fluids, the sealing composition rapidly (within a few seconds or minutes) forms a sealing mass having ultra high viscosity.

After its preparation, the sealing composition utilized is pumped through one or more openings at the end of the string of drill pipe into the zone to be sealed at a low flow rate relative to the well bore fluids in the zone. As a result, the sealing composition flows through the well bore fluids with a minimum of mixing therewith whereby portions of the sealing composition are continuously converted to sealing masses as the sealing composition flows through the zone to be sealed. The sealing masses are first successively diverted into any permeable portions of the zone through which fluids are flowing out of the zone. That is, the sealing masses flow into and seal the most permeable portions of the zone first followed by the least permeable portions through which fluids are exiting the zone. As the outflow permeable portions of the zone are sealed, the hydrostatic pressure exerted on the zone is increased. Once all of the permeable portions through which fluid is exiting the zone have been sealed, the hydrostatic pressure is increased to the point where the inflow of fluids to the zone (if a crossflow or blowout is being experienced) is terminated and reversed, i.e., well bore fluids are caused to flow out of the permeable portions of the zone through which formation fluids were previously flowing in the zone. This, in turn, causes additional sealing masses to flow into and seal the previously inflow permeable portions.

Thus, in accordance with the methods of this invention, the sealing compositions utilized are self-diverting and plug multiple outflow and inflow permeable portions of a zone in a single well treatment. When a well contains a crossflow or underground blow-out, the high viscosity sealing masses formed by the sealing composition plug all of the lower pressure outflow permeable portions of the involved zone and as the hydrostatic pressure in the zone is increased, the crossflow or blow-out permeable portions of the zone are also plugged. The resultant sealed zone achieved by the methods of this invention can hold higher drilling fluid hydrostatic pressures and a wedging effect is produced in sealed vugs and fractures that increases the integrity of the entire zone. The portion of a sealing composition left in the well bore after sealing permeable portions of a zone being treated remains movable to divert to other zones above or below the sealed zone. The sealing masses are not readily diluted and are not easily washed away by crossflows due to the increase in hydrostatic pressure exerted on the zone being sealed.

As mentioned above, one of the important aspects of the methods of the present invention is the control of the flow rate of the sealing composition through the well bore fluids contained in the zone to be sealed. Generally, the sealing composition pumped into the zone to be sealed is limited to a flow rate relative to the well bore fluids therein in the range of from about 0.5 to about 5 barrels per minute. In order to produce plug or fingering flow of the sealing composition through the well bore fluids for long distances, the string of drill pipe through which the sealing composition is pumped is preferably open ended or it has a drill bit attached thereto which has large ports therein.

In a preferred technique, a well bore fluid comprised of water, oil or both is pumped into the zone to be sealed by way of the annulus between the well bore and the string of drill pipe therein while the sealing composition is pumped through one or more openings at the end of the string of drill pipe into the zone. The flow rate of the sealing composition pumped into the zone to the flow rate of the well bore fluids pumped into the zone is controlled at a ratio in the range of from about 1:4 to about 4:1. As mentioned, the careful control of the opening or openings in the drill pipe and flow rates mentioned above results in the ability of the sealing composition to flow through the zone to be sealed with a minimum of mixing taking place whereby portions of the sealing composition are continuously converted to sealing masses as the sealing composition flows through the well bore and the zone to be sealed. The sealing masses are successively diverted into the permeable portions of the zone thereby allowing the hydrostatic pressure exerted in the zone to increase until all of the permeable portions in the zone are sealed.

In some zone sealing applications utilizing the methods of this invention, it is preferred to maintain the hydrostatic pressure exerted on the zone during the introduction of the sealing composition therein at a pressure above the fracture gradient of the zone, i.e., the pressure at which fractures are formed in the zone. By fracturing the zone to be sealed simultaneously with the sealing of permeable portions thereof, wide-short fractures are produced which are filled with the sealing masses formed by the sealing composition. The forming and sealing of initial fractures causes the plane of maximum stress in the zone to be altered which produces additional short-wide fractures which are filled with sealing masses. This process of forming and sealing short-wide fractures at many locations in the zone to be sealed as well as in adjacent stronger zones creates a combined wedge effect that artificially strengths the zone. In some cases, the integrity of the well bore and weak zone or zones through which it passes are increased enough to eliminate the necessity of setting pipe until after the well bore has been drilled ahead a considerable distance.

Depending upon the nature of the well bore fluids involved, the sealing composition can be either oil based or water based. The oil based compositions react with water in the well bore fluids to immediately form sealing masses having ultra high viscosity. The water based compositions react with oil base drilling fluids contained in the well bore and/or other oil and water in the well bore to immediately form sealing masses of ultra high viscosity.

Particularly suitable oil based sealing compositions for use in accordance with the methods of this invention are basically comprised of oil, a hydratable polymer, an organophillic clay and a water swellable clay. The hydratable polymer reacts with water in the well bore and is immediately hydrated whereby a highly viscous gel is formed. The water swellable clay immediately swells in the presence of water and together with the viscous gel forms a highly viscous sealing mass. The organophillic clay reacts with the oil carrier fluid to add viscosity to the composition so that the polymer and clay do not settle out of the oil prior to reacting with water in the well bore.

Any of a variety of oils can be utilized in the oil based sealing compositions which do not adversely react with other components of the compositions and react with the organophillic clay to bring about an increase in viscosity of the compositions prior to contacting water. Of the various oils which can be used, diesel oil is presently preferred. The oil is included in the compositions in an amount in the range of from about 32% to about 62% by weight of the compositions.

A variety of hydratable polymers can also be utilized in the oil based compositions with those that yield high viscosity upon hydration being the most suitable. For example, one or more of guar gum, guar derivatives such as hydroxypropylguar and cellulose derivatives such as hydroxyethylcellulose are preferred. Of these, hydroxyethylcellulose is the most preferred. The hydratable polymer is included in the compositions in an amount in the range of from about 3% to about 6% by weight of the compositions.

Various organophillic clays can be used with the preferred organophillic clay being an alkyl quaternary ammonium bentonite clay. The organophillic clay is included in the compositions in an amount in the range of from about 0.3% to about 0.6% by weight of the compositions.

The water swellable clay can be one or more clays such as montmorillonite, attapulgite and bentonite. Of these, bentonite is preferred. The water swellable clay is generally present in the sealing compositions in an amount in the range of from about 34% to about 62% by weight of the compositions.

The oil based compositions can also include other well known additives such as dispersing agents, inert fillers and cements.

Preferred water based compositions which can be utilized in accordance with the methods of the present invention are basically comprised of water, an aqueous rubber latex, an organophillic clay and sodium carbonate. The aqueous rubber latex present in the compositions is caused to destabilize and precipitate by water in the well bore containing electrolyte such as calcium chloride and the organophillic clay reacts with oil in the well bore to form a high viscosity rubbery sealing mass. The sodium carbonate in the compositions functions as a buffer and prevents the destabilization of the rubber latex in the event of its contact with calcium and the like in the water used to form the compositions The water in the sealing compositions which is in addition to the water contained in the aqueous latex is included in the compositions to make the compositions pumpable. The water can be from any source provided it does not contain calcium and other compounds that adversely affect the rubber latex and other components in the compositions. However, fresh water is preferred. Generally, the water is present in an amount in the range of from about 6% to about 50% by weight of the compositions.

A variety of well known rubber latexes can be utilized in accordance with the present invention with a styrene/butadiene copolymer latex emulsion being the most preferred. Such a styrene/butadiene latex can include in the range of from about 40% to about 70% water by weight of the latex. The weight ratio of styrene to butadiene in the latex can range from about 10%:90% to about 90%:10%. The latex utilized is included in the water based sealing compositions in an amount in the range of from about 33% to about 67% by weight of the compositions.

In order to prevent the aqueous latex from prematurely coagulating and increasing the viscosity of the sealing compositions, an effective amount of a latex stabilizing surfactant can be included in the compositions. Latex stabilizing surfactants which are suitable for use in accordance with this invention are surfactants having the formula

wherein R is an alkyl group having from about 5 to about 30 carbon atoms, Ph is phenyl and m is an integer in the range of from about 5 to about 50.

A preferred surfactant in the above defined group is ethoxylated nonylphenyl containing in the range of from about 20 to about 30 moles of ethylene oxide.

Another suitable surfactant is a sodium salt having the formula

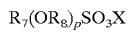

wherein $R_7$ is an alkyl group having in the range of from about 5 to about 20 carbon atoms, $R_8$ is the group —$CH_2CH_2$—, p is an integer in the range of from about 10 to about 40 and X is a compatible cation. A particularly preferred surfactant of this type is the sodium salt of a sulfonated compound derived by reacting a $C_{12}$ to $C_{15}$ alcohol with about 15 moles of ethylene oxide having the formula

which is commercially available under the name "AVANEL S150™" from PPG Mazer, Mazer Chemicals, a Division of PPG Industries, Inc., of Gurnee, Ill.

When a latex stabilizing surfactant is included in the sealing compositions of this invention, it is usually included in the compositions in an amount up to about 35% by weight of the aqueous rubber latex included therein. When the aqueous latex is an aqueous styrene/butadiene latex, the latex stabilizing surfactant utilized is preferably included in the sealing compositions in an amount up to about 25%.

The organophillic clay is preferably an alkyl quaternary ammonium bentonite clay present in the compositions in an amount in the range of from about 13% to about 22% by weight of the compositions, and the sodium carbonate is present in the compositions in an amount in the range of from about 2.7% to about 4.4% by weight of the compositions.

The water based sealing compositions can also include additives such as dispersing agents, defoaming agents, fillers, cements and the like.

Generally, the sealing compositions utilized in accordance with the present invention must instantly form a sealing mass having ultra high viscosity when mixed with well bore fluids. The sealing mass must be capable of being displaced through the well bore and enter and seal permeable portions of a subterranean zone to be sealed such as vugs and fractures, i.e., the sealing mass must form a flexible seal which can be extruded or squeezed into vugs and fractures.

Thus, the improved methods of the present invention for sealing a subterranean zone penetrated by a well bore containing a string of drill pipe to prevent the uncontrolled flow of fluids into and out of the zone by way of permeable portions thereof comprise the steps of:

(1) preparing a pumpable sealing composition which rapidly converts into a high viscosity sealing mass upon mixing and reacting with well bore fluids comprising water, oil or both contained in the well bore, and (2) pumping the sealing composition through one or more openings at the end of the string of drill pipe into the zone at a low flow rate relative to the well bore fluids therein whereby the sealing composition flows through the well fluids with a minimum of mixing therewith and whereby portions of the sealing composition are converted to sealing masses as the sealing composition flows through the zone, the sealing masses being successively diverted into and sealing the permeable portions of the zone through which fluids are flowing out of the zone thereby allowing the hydrostatic pressure exerted in the zone to increase until all of the permeable portions in the zone are sealed.

As mentioned, the methods of this invention can also include the further step of pumping well bore fluids through the annulus between the well bore and the string of drill pipe into the zone being sealed while the sealing composition is pumped through one or more openings at the end of the string of drill pipe into the zone.

In order to further illustrate the methods of the present invention, the following examples are given.

EXAMPLE 1

An oil based sealing composition of the present invention comprised of diesel oil present in an amount in the range of from about 43% to about 53%, hydroxyethylcellulose present in an amount in the range of from about 4% to about 5%, an alkyl quaternary ammonium bentonite clay present in an amount in the range of from about 0.4% to about 0.5% and water swellable bentonite clay present in an amount in the range of from about 42% to about 53%, all by weight of the composition was prepared in the laboratory. A portion of the sealing composition was added to an equal portion of a water based drilling fluid. Within about 10 seconds a solid high viscosity mass was formed which had a moldable consistency.

EXAMPLE 2

In a well being drilling with water based drilling fluid, a highly permeable zone was encountered whereby about 60 barrels per hour of the drilling fluid were being lost. An oil based sealing composition as described in Example 1 above was prepared. Equal portions of the composition were pumped down the drill pipe and down the annulus, each at a rate of one barrel per minute. As the composition reacted with the water based drilling fluid in the well bore, high viscosity resilient masses were formed which entered and sealed the permeable zone or zones through which the drilling fluid losses occurred whereupon drilling was resumed.

EXAMPLE 3

A water based sealing composition of the present invention comprised of water present in an amount in the range of from about 30% to about 42%, an aqueous styrene/butadiene latex present in an amount in the range of from about 39% to about 47%, an alkyl quaternary ammonium bentonite clay present in an amount in the range of from about 16% to about 19%, sodium carbonate present in an amount in the range of from about 3.3% to about 3.7%, a dispersing agent comprised of the condensation reaction product of acetone, formaldehyde and sodium sulfite present in an amount in the range of from about 0.4% to about 0.47%, welan gum present in an amount in the range of from about 0.1% to about 0.2%, and polydimethylsiloxane defoaming agent present in an amount in the range of from about 0.8% to about 1.2%, all by weight of the composition, was prepared in the laboratory. A portion of the sealing composition was added to an equal portion of a diesel oil based drilling fluid. Within about 20 seconds a solid high viscosity mass was formed which had a moldable consistency.

EXAMPLE 4

In a well being drilled with a non-aqueous drilling fluid, a fractured zone was encountered whereby about 20 barrels per hour of the drilling fluid were being lost. A water based sealing composition as described in Example 1 above was prepared. Equal portions of the composition were pumped down the drill pipe and down the annulus, each at a rate of about one barrel per minute. As the composition reacted with the non-aqueous based drilling fluid in the well bore, high viscosity resilient masses were formed which entered and sealed the fractured zone or zones through which the drilling fluid losses occurred whereupon drilling was resumed.

Thus, the present invention is well adapted to carry out the objects and attain the ends and advantages mentioned as well as those which are inherent therein. While numerous changes to the methods can be made by those skilled in the art, such changes are encompassed within the spirit of this invention as defined by the appended claims.

What is claimed is:

1. An improved method of sealing a subterranean zone penetrated by a well bore containing a string of drill pipe to prevent the uncontrolled flow of fluids into and out of the zone by way of permeable portions thereof comprising the steps of:

preparing a pumpable sealing composition which rapidly converts into a high viscosity sealing mass upon mixing and reacting with well bore fluids comprising water contained in said well bore, said sealing composition being comprised of water, an aqueous rubber latex, an organophillic clay and sodium carbonate; and pumping said sealing composition through one or more openings at the end of said string of drill pipe into said zone at a low flow rate relative to said well bore fluids therein whereby said sealing composition flows through said well bore fluids with a minimum of mixing therewith and whereby portions of said sealing composition are converted to sealing masses as said sealing composition flows through said zone, said sealing masses being successively diverted into and sealing said permeable portions of said zone through which fluids are flowing out of said zone thereby allowing the hydrostatic pressure exerted in said zone to increase until all of said permeable portions in said zone are sealed.

2. The method of claim 1 wherein said flow rate of said sealing composition pumped into said well bore relative to said well bore fluids therein is in the range of from about 0.5 to about 5 barrels per minute.

3. The method of claim 1 wherein said string of drill pipe is open-ended.

4. The method of claim 1 wherein said string of drill pipe includes a drill bit attached thereto having large ports therein.

5. The method of claim 1 which further comprises the step of pumping well bore fluids through the annulus between said well bore and said string of drill pipe into said zone while said sealing composition is pumped through said one or more openings at the end of said string of drill pipe into said zone.

6. The method of claim 5 wherein the ratio of the flow rate of said sealing composition pumped into said zone to the flow rate of said well bore fluids pumped therein is in the range of from about 1:4 to about 4:1.

7. An improved method of sealing a subterranean zone penetrated by a well bore containing a string of drill pipe to prevent the uncontrolled flow of fluids into and out of the zone by way of permeable portions thereof comprising the steps of:

preparing a pumpable sealing composition which rapidly converts into a high viscosity sealing mass upon mixing and reacting with well bore fluids comprising water contained in said well bore, said sealing composition being comprised of water, an aqueous rubber latex, an organophillic clay and sodium carbonate; and pumping said sealing composition through one or more openings at the end of said string of drill pipe into said zone at a low flow rate relative to said well bore fluids therein and at a pressure whereby fractures are formed in said zone whereby said sealing composition flows through said well bore fluids with a minimum of mixing therewith and whereby portions of said sealing composition are converted to sealing masses as said sealing composition flows through said zone, said sealing masses being successively diverted into and sealing said fractures and said permeable portions of said zone through which fluids are flowing out of said zone thereby allowing the hydrostatic pressure exerted in said zone to increase until all of said permeable portions in said zone are sealed.

8. An improved method of sealing a subterranean zone penetrated by a well bore containing a string of drill pipe to prevent the uncontrolled flow of fluids into and out of the zone by way of permeable portions thereof comprising the steps of:

preparing a pumpable sealing composition which rapidly converts into a high viscosity sealing mass upon mixing and reacting with well bore fluids comprising water contained in said well bore, said sealing composition being comprised of water, an aqueous rubber latex, an organophillic clay and sodium carbonate;

pumping said sealing composition through one or more openings at the end of said string of drill pipe into said zone;

pumping well bore fluids through the annulus between said well bore and said string of drill pipe into said zone while said sealing composition is pumped through said one or more openings at the end of said string of drill pipe into said zone; and controlling the flow rates of said sealing composition through said string of drill pipe and said well bore fluids through said annulus whereby portions of said sealing composition are converted to sealing masses as said sealing composition flows through said zone, said sealing masses being successively diverted into and sealing said permeable portions of said zone through which fluids are flowing out of said zone thereby allowing the hydrostatic pressure exerted in said zone to increase until all of said permeable portions in said zone are sealed.

9. The method of claim 8 wherein said flow rate of said sealing composition pumped into said zone relative to said well bore fluids therein is in the range of from about 0.5 to about 5 barrels per minute.

10. The method of claim 8 wherein said string of drill pipe is open-ended.

11. The method of claim 8 wherein said string of drill pipe includes a drill bit attached thereto having large ports therein.

12. The method of claim 8 wherein the ratio of the flow rate of said sealing composition pumped into said zone to the flow rate of said well bore fluids pumped therein is in the range of from about 1:4 to about 4:1.

13. The method of claim 8 wherein said sealing composition is pumped into said zone at a pressure whereby fractures are formed in said zone which are filled with said sealing masses.

14. The method of claim 8 wherein said aqueous rubber latex is an aqueous styrene/butadiene latex and said organophillic clay is alkyl quaternary ammonium bentonite.

15. The method of claim 14 wherein said sealing composition further comprises a latex stabilizer comprised of a sulfonated and ethoxylated compound having the formula $H(CH_2)_{12-15}(CH_2CH_2O)_{15}SO_3Na$.

16. The method of claim 1 wherein the water of said sealing composition is present in an amount in the range of from about 6% to about 50% by weight of said composition.

17. The method of claim 1 wherein the aqueous rubber latex is present in an amount in the range of from about 33% to about 67% by weight of said composition.

18. The method of claim 17 wherein the aqueous rubber latex is a styrene/butadiene latex.

19. The method of claim 18 wherein the styrene/butadiene latex includes in the range of from about 40% to about 70% water by weight of the latex and the weight ratio of styrene to butadiene in the latex is in the range of from about 10%:90% to about 90%:10%.

20. The method of claim 1 wherein the organophillic clay is an alkyl quaternary ammonium bentonite clay present in said sealing composition in an amount in the range of from about 13% to about 22% by weight of said composition.

21. The method of claim 1 wherein the sodium carbonate is present in said sealing composition in an amount in the range of from about 2.7% to about 4.4% by weight of said composition.

22. The method of claim 1 wherein said sealing composition further comprises a latex stabilizing surfactant.

23. The method of claim 22 wherein said latex stabilizing surfactant is selected from a surfactant having the formula $$R-Ph-O(OCH_2CH_2)_mOH$$

wherein R is an alkyl group having from about 5 to about 30 carbon atoms, Ph is phenyl and m is an integer in the range of from about 5 to about 50, or a sodium salt having the formula $$R_7(OR_8)_pSO_3X$$

wherein $R_7$ is an alkyl group having in the range of from about 5 to about 20 carbon atoms, $R_8$ is the group $-CH_2CH_2-$, p is an integer in the range of from about 10 to about 40 and X is a compatible cation.

24. The method of claim 22 wherein the latex stabilizing surfactant is comprised of a sulfonated and ethoxylated compound having the formula $H(CH_2)_{12-15}(CH_2CH_2O)_{15}SO_3Na$.

25. The method of claim 22 wherein the latex stabilizing surfactant is present in said sealing composition in an amount up to about 35% by weight of the aqueous rubber latex in said composition.

* * * * *